J. R. BIGNELL.
CUTTING AND FOLDING MACHINE.
APPLICATION FILED SEPT. 14, 1916.

1,283,056.

Patented Oct. 29, 1918.
20 SHEETS—SHEET 3.

Witnesses
Harry R. Lubite,
W. P. Kilroy

Inventor
James R. Bignell
By Cyrus W. Rice
his Atty.

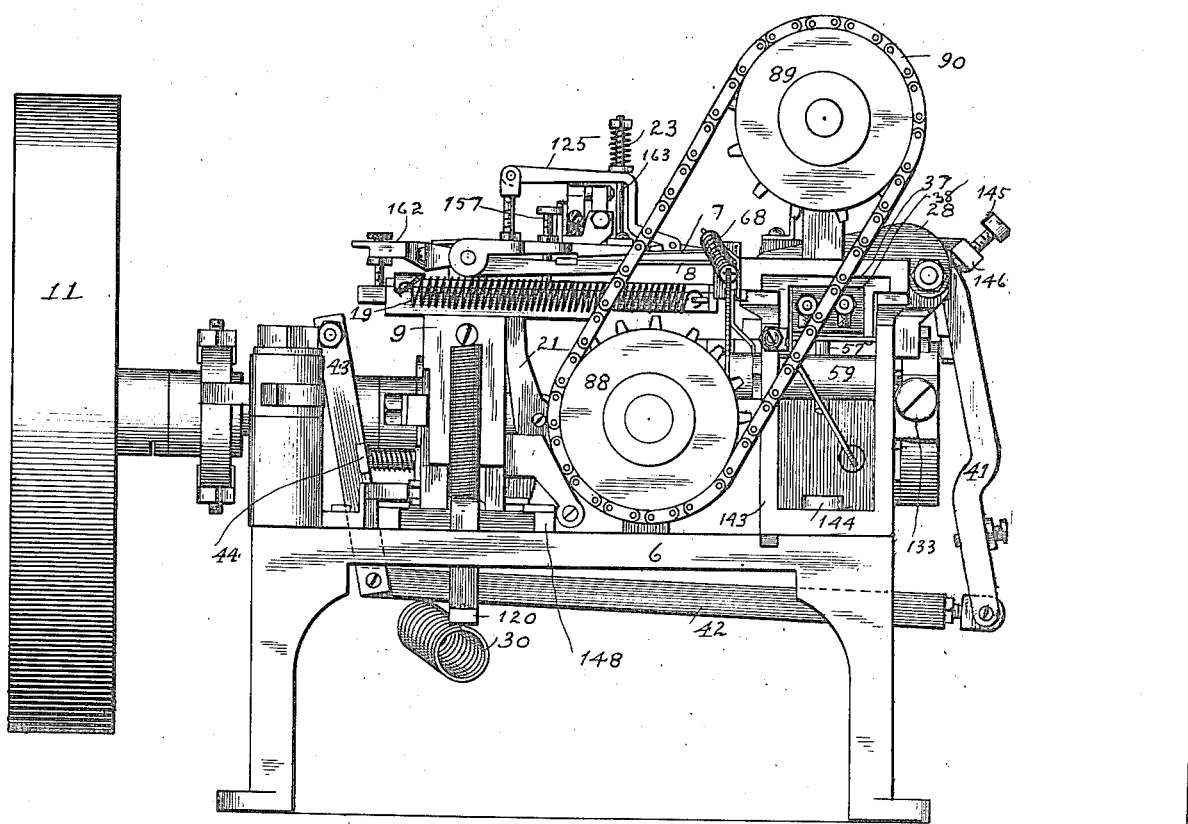

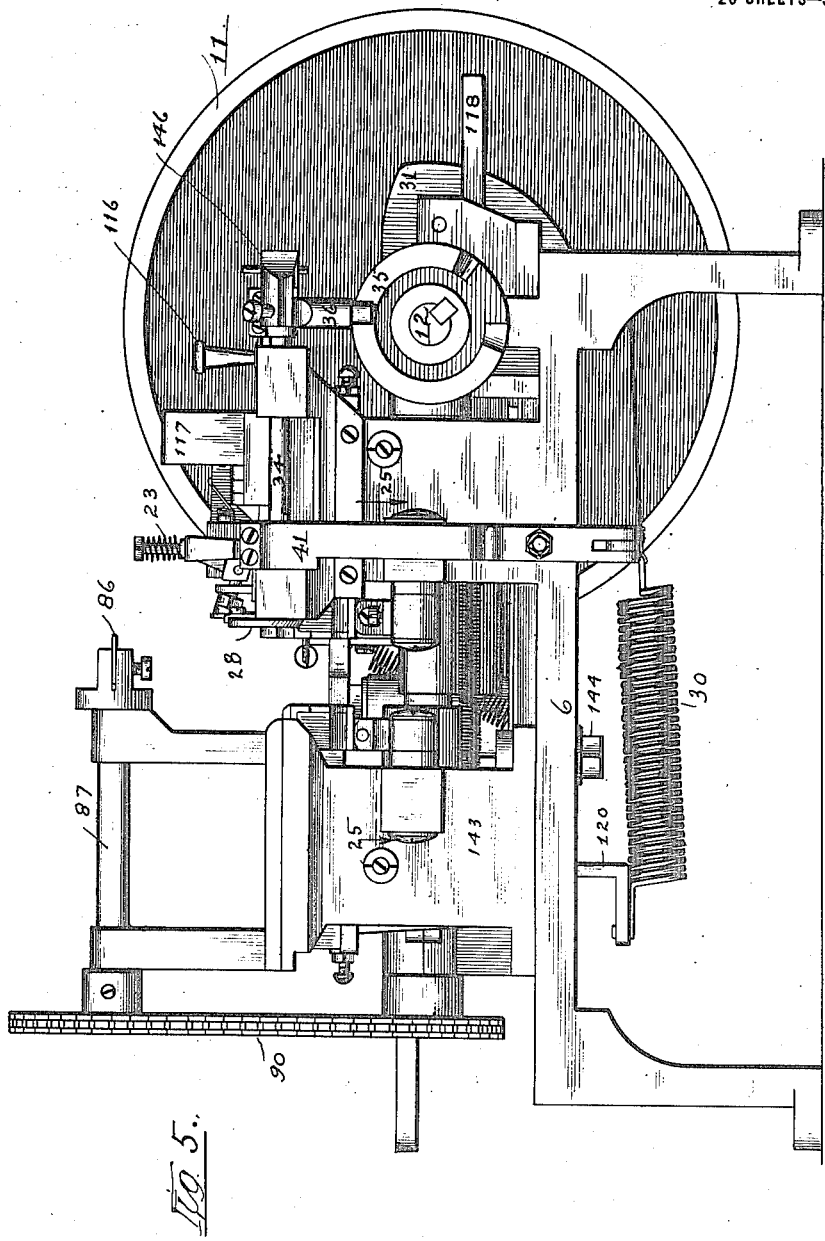

J. R. BIGNELL.
CUTTING AND FOLDING MACHINE.
APPLICATION FILED SEPT. 14, 1916.
1,283,056.
Patented Oct. 29, 1918.
20 SHEETS—SHEET 6.
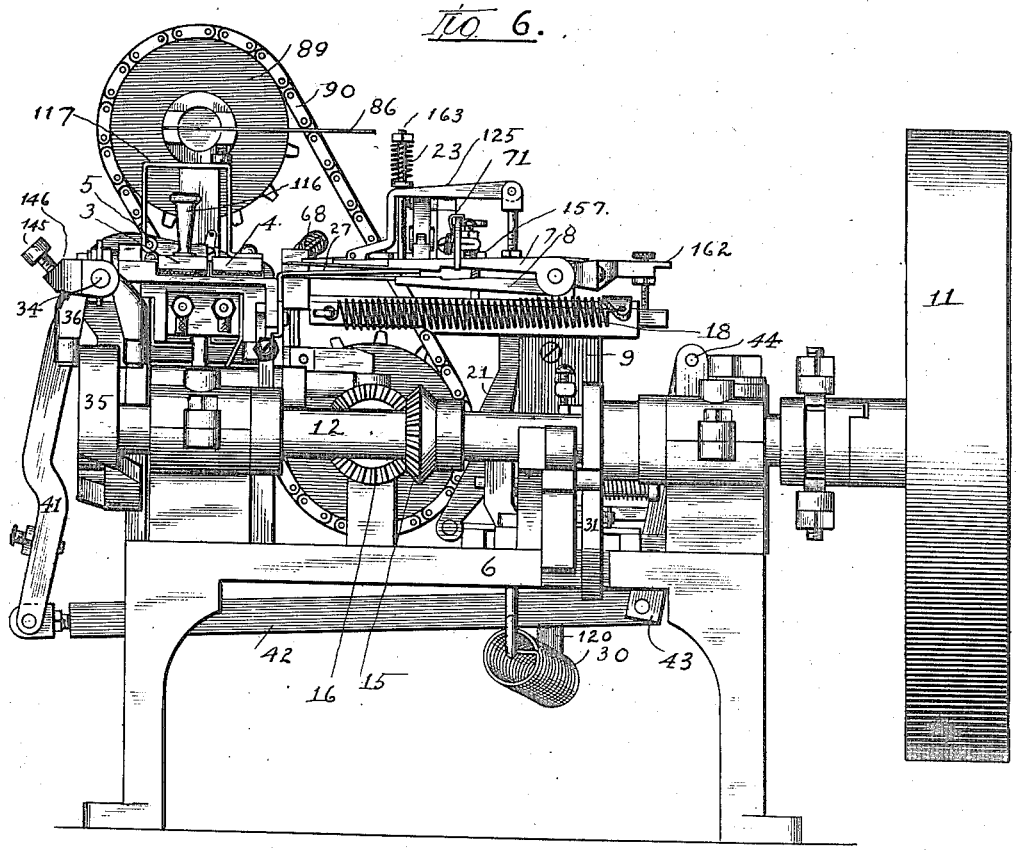

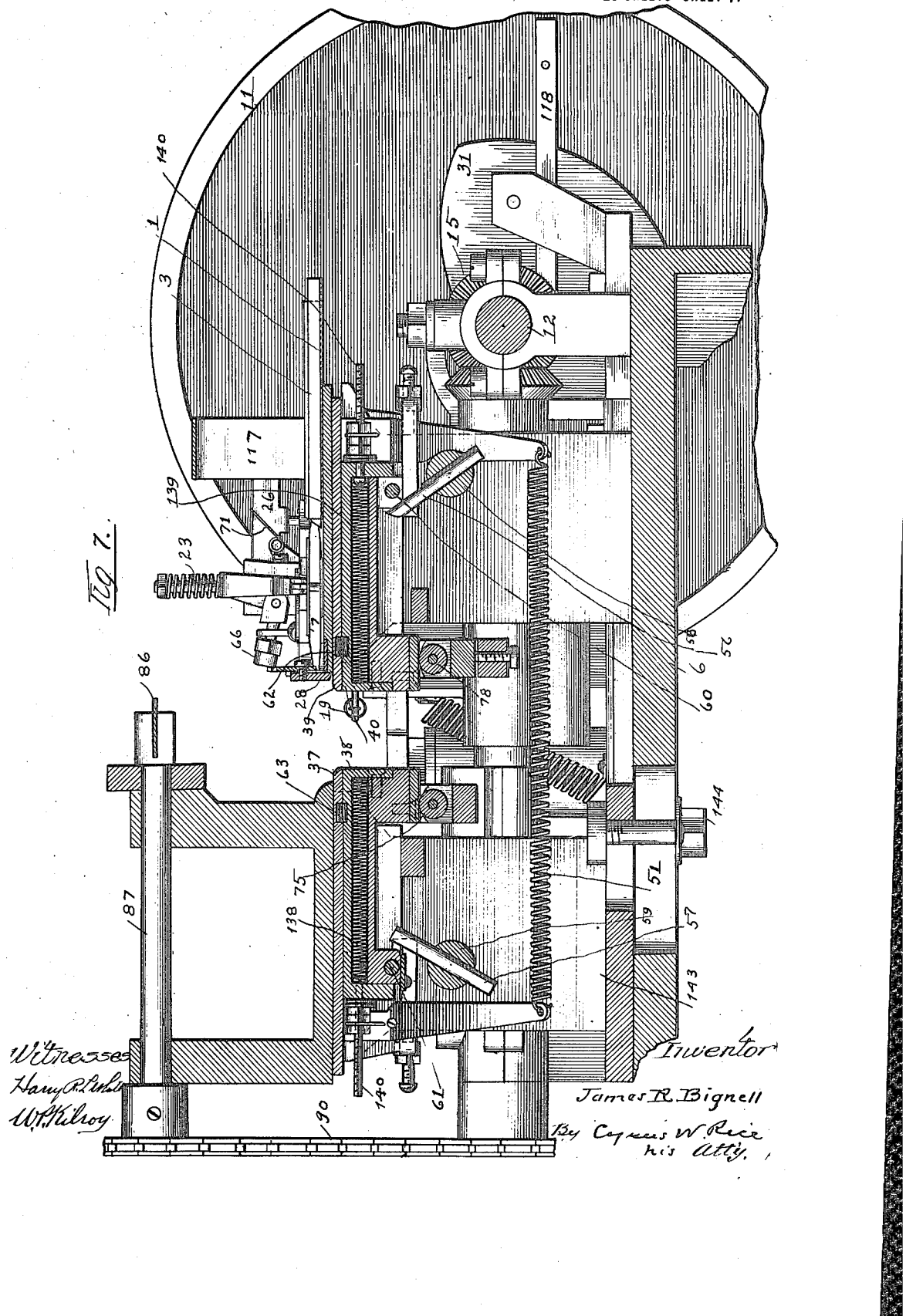

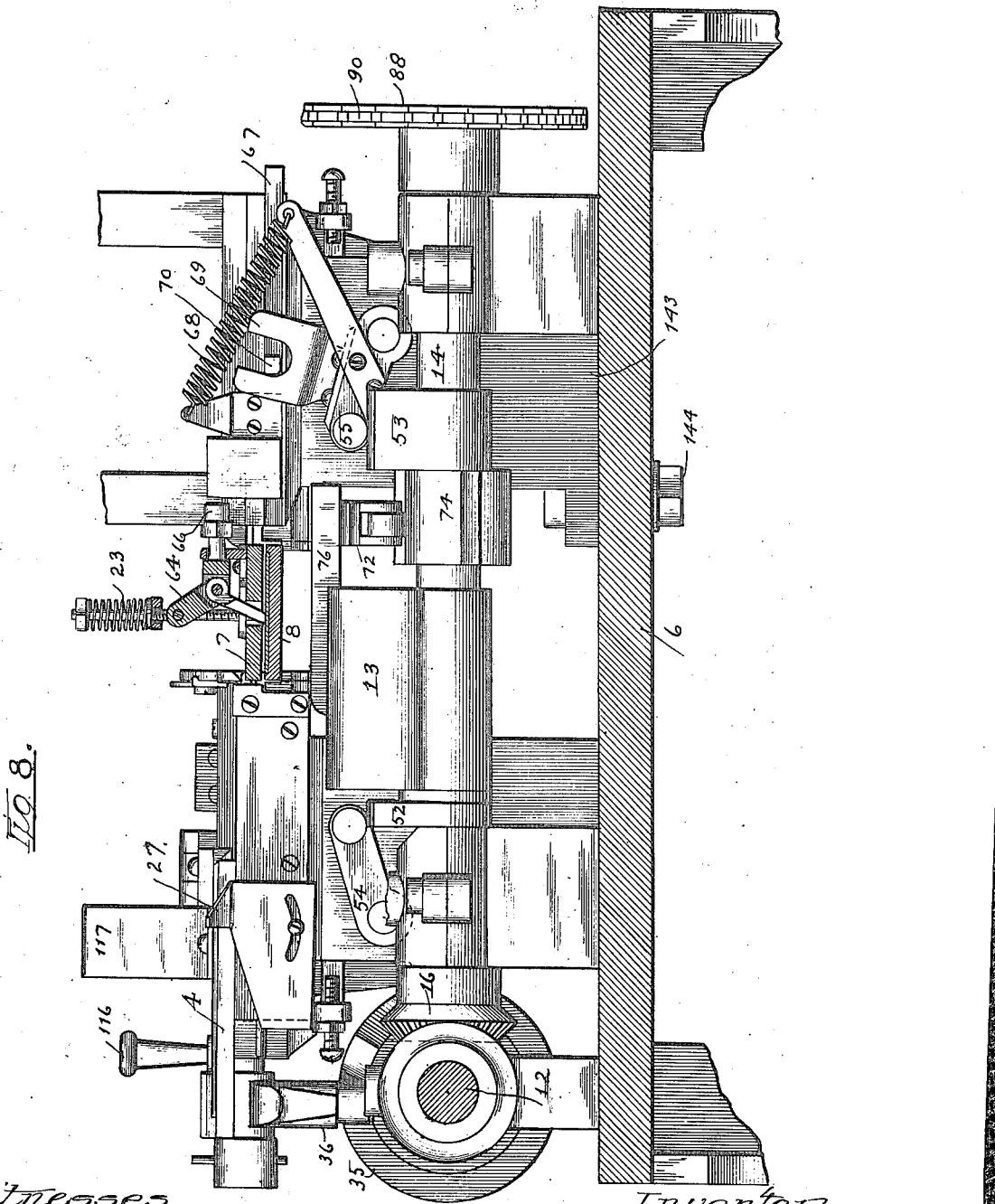

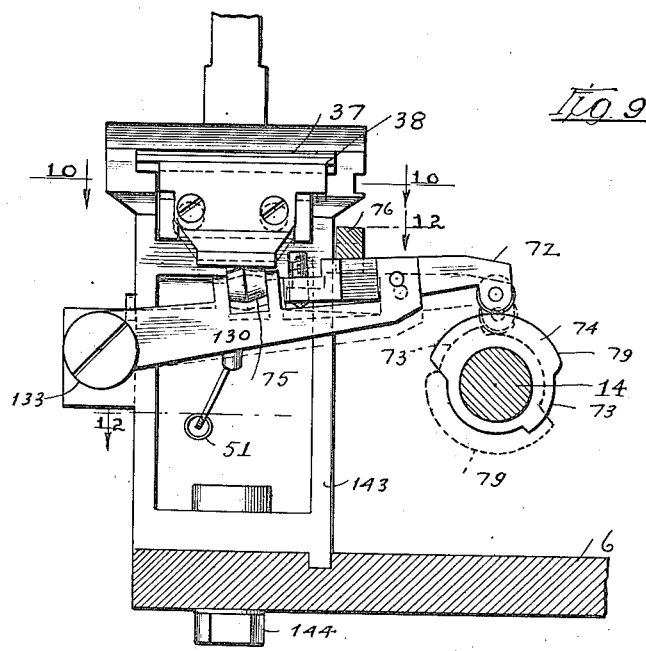
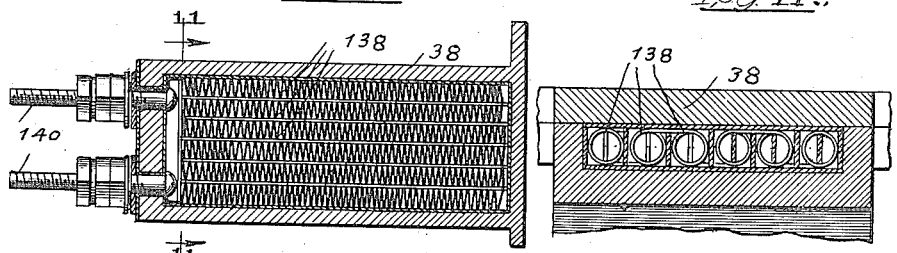
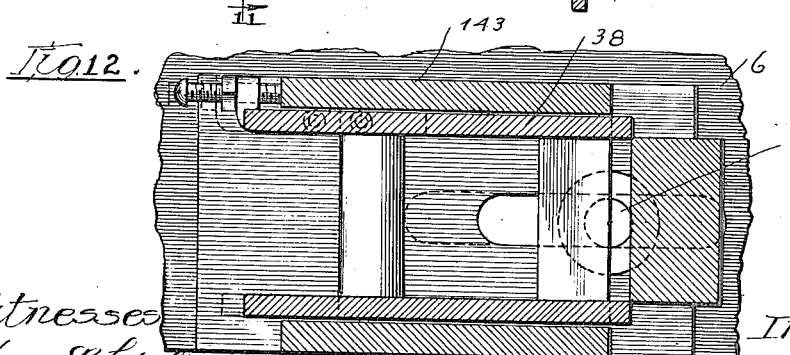

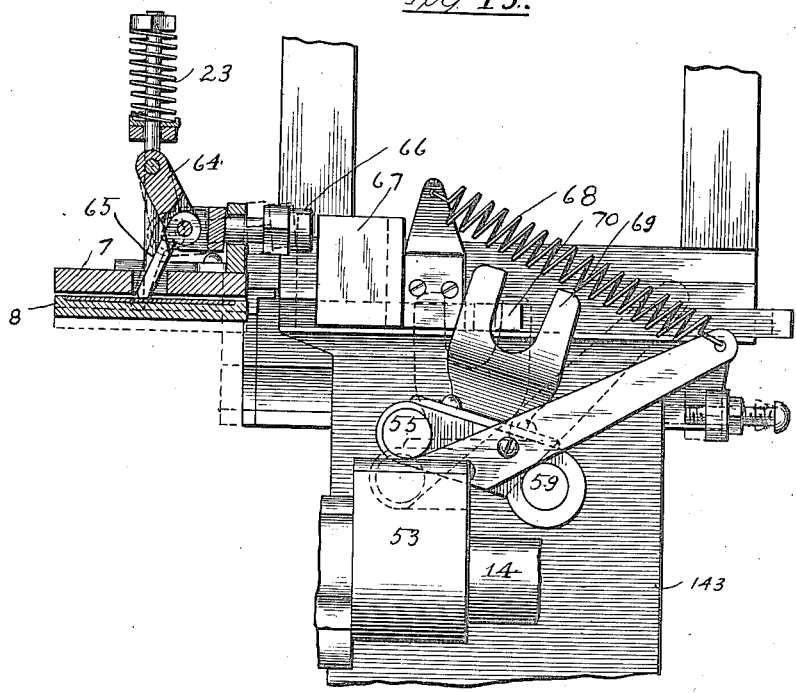
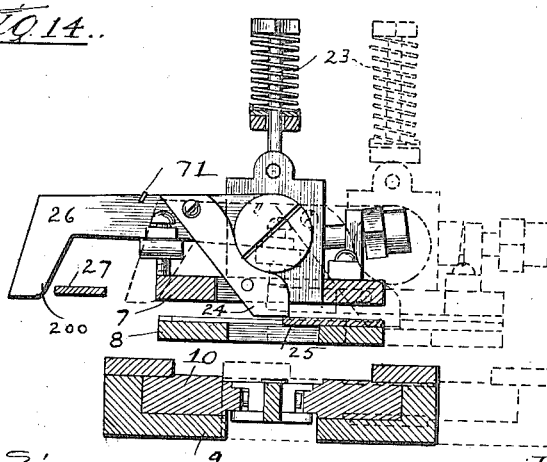

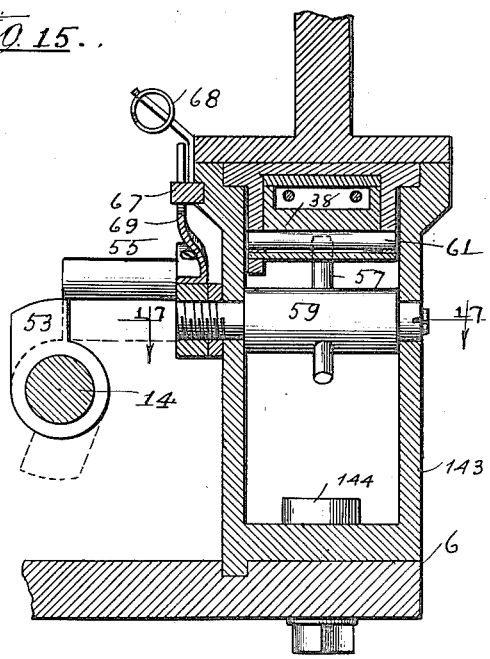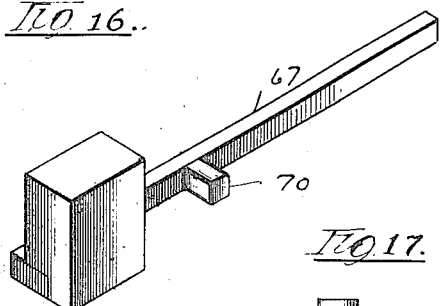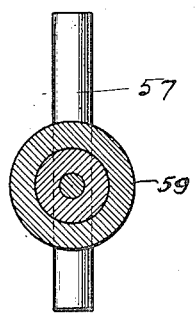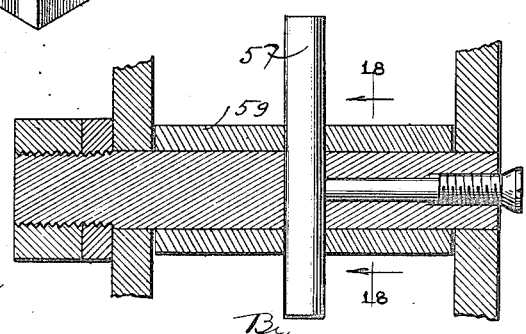

J. R. BIGNELL.
CUTTING AND FOLDING MACHINE.
APPLICATION FILED SEPT. 14, 1916.
1,283,056.
Patented Oct. 29, 1918.
20 SHEETS—SHEET 12.
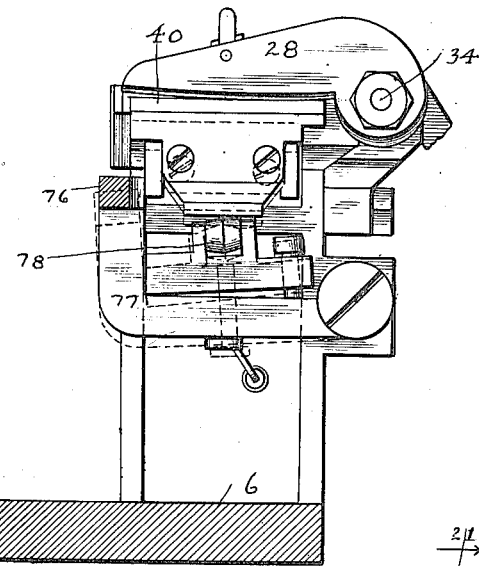
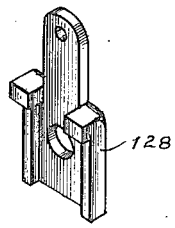
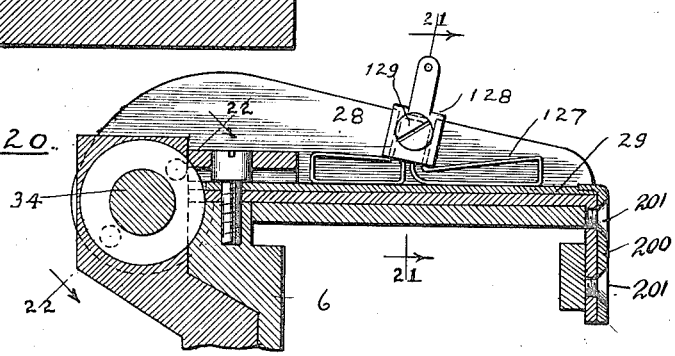
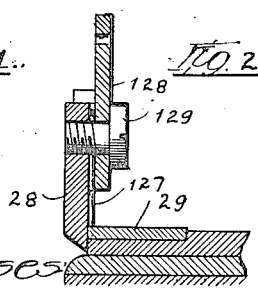
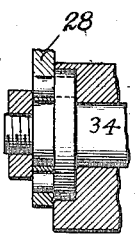
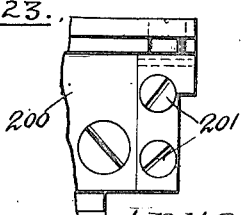
Inventor
James R. Bignell
By Cyrus W Rice
his Atty.

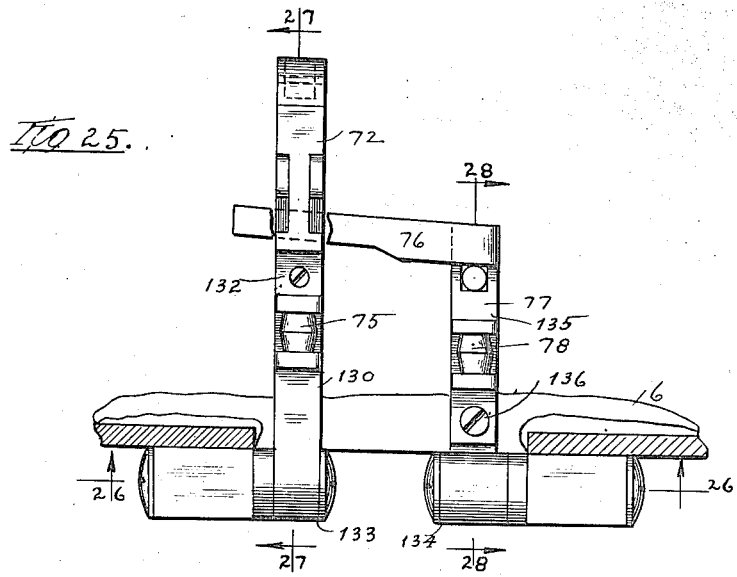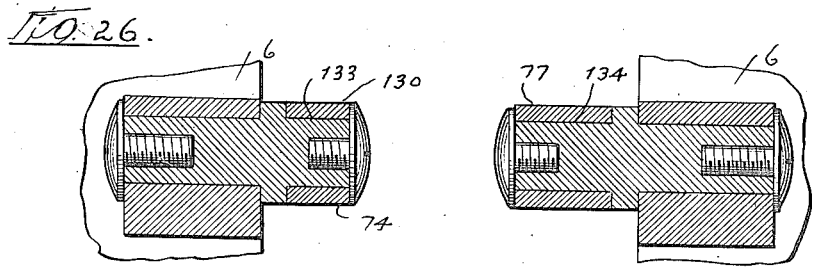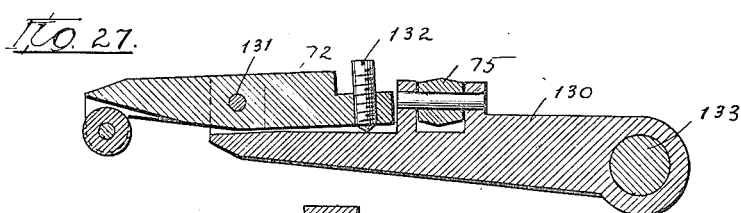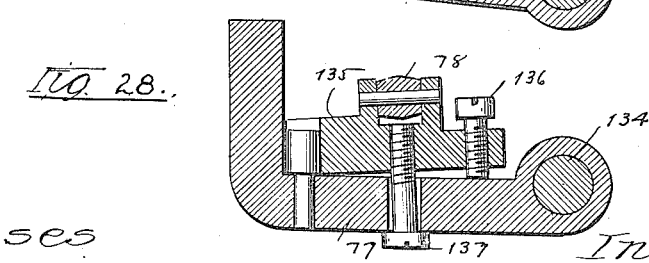

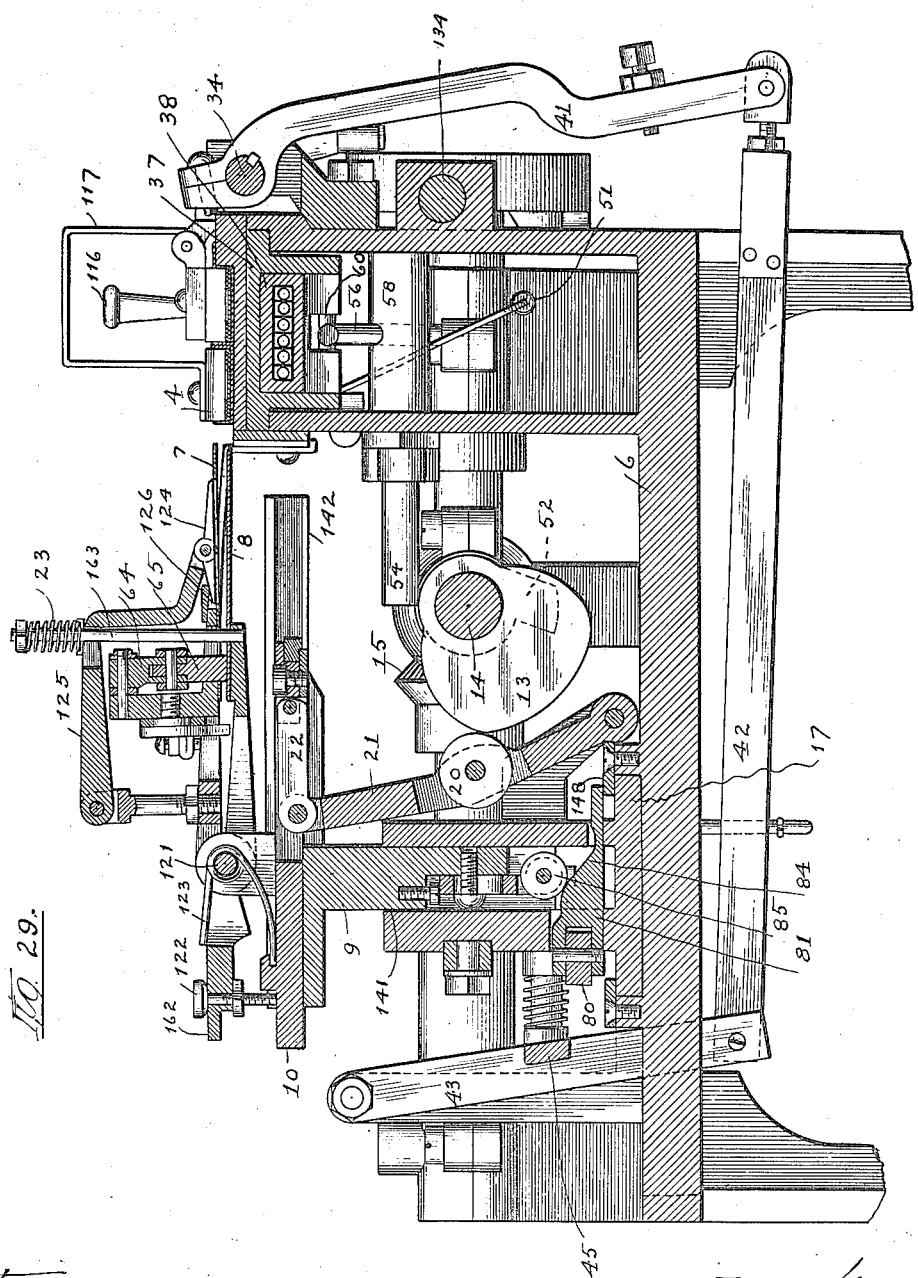

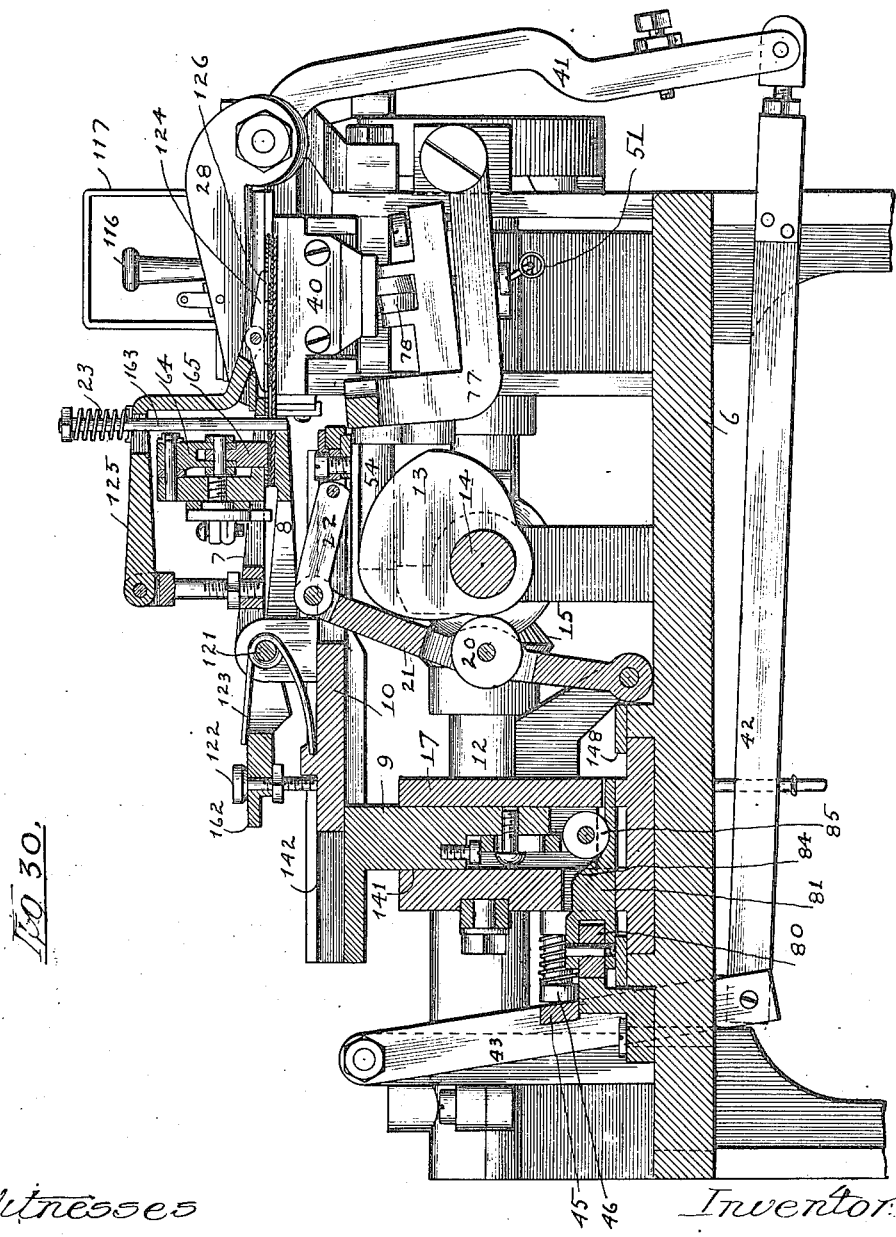

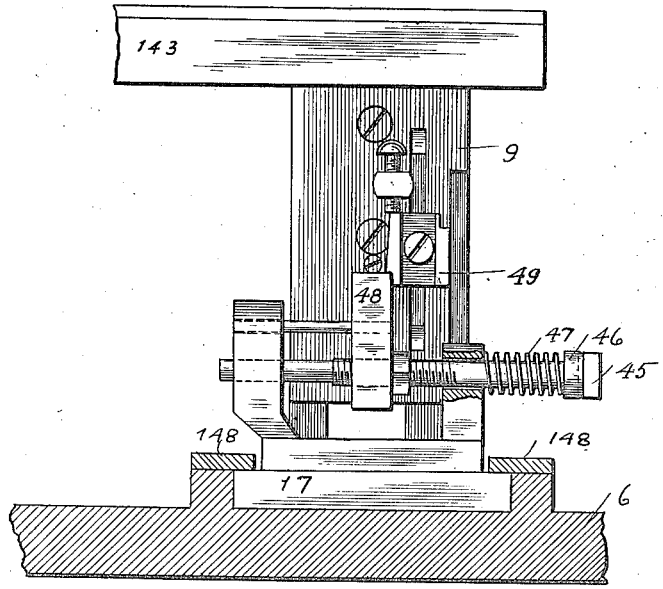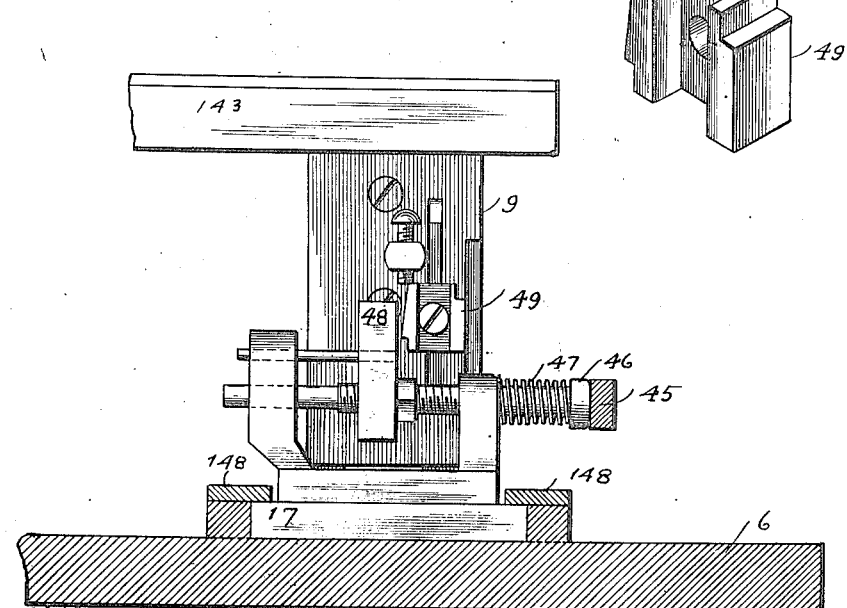

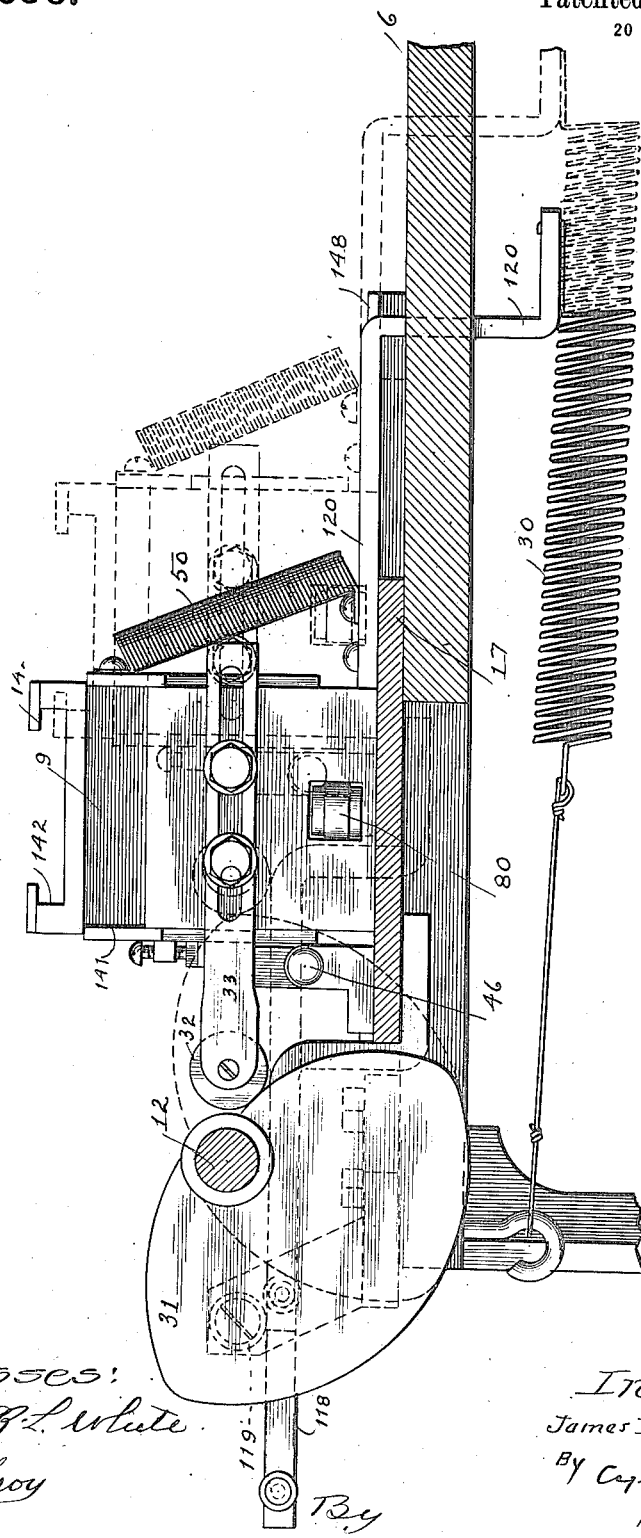

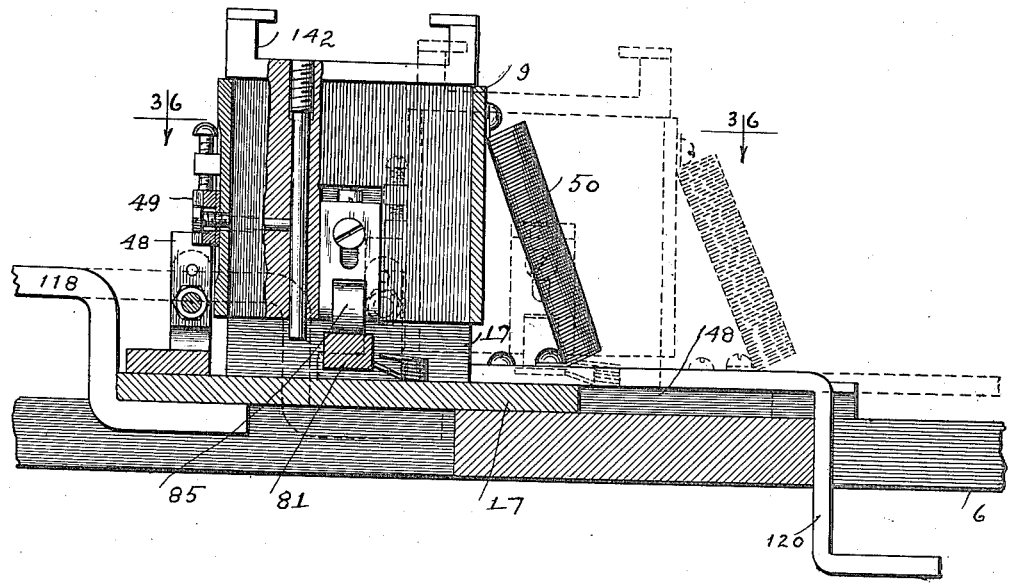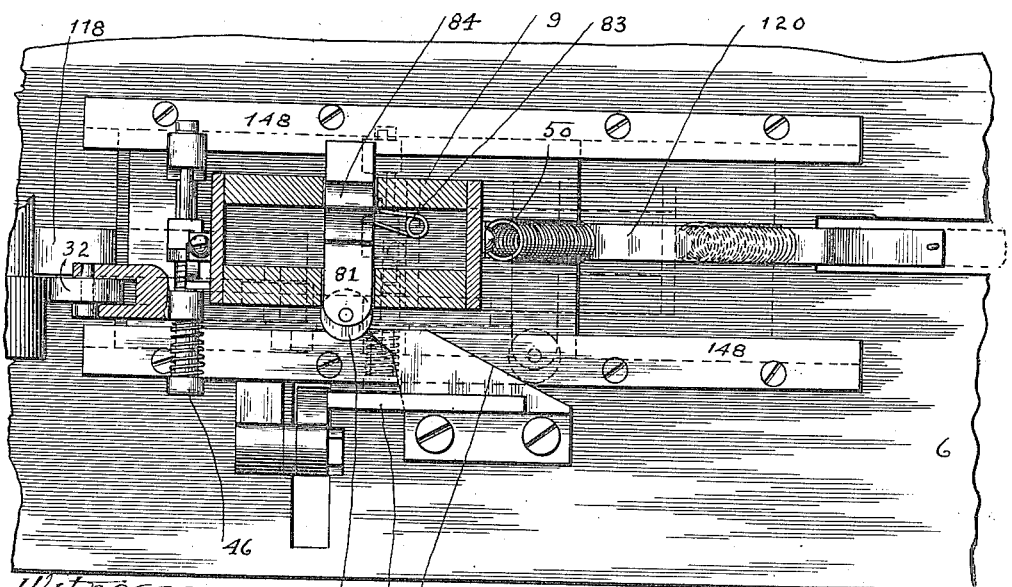

J. R. BIGNELL.
CUTTING AND FOLDING MACHINE.
APPLICATION FILED SEPT. 14, 1916.

1,283,056.

Patented Oct. 29, 1918.
20 SHEETS—SHEET 20.

Witnesses
Harry W. L. White
W. F. Kilroy

Inventor
James R. Bignell
By Cyrus W. Rice
his Atty.

UNITED STATES PATENT OFFICE.

JAMES R. BIGNELL, OF GRAND RAPIDS, MICHIGAN, ASSIGNOR TO THE ROSE PATCH AND LABEL COMPANY, OF GRAND RAPIDS, MICHIGAN, A CORPORATION OF MICHIGAN.

CUTTING AND FOLDING MACHINE.

1,283,056.  Specification of Letters Patent.  Patented Oct. 29, 1918.

Application filed September 14, 1916. Serial No. 120,176.

*To all whom it may concern:*

Be it known that I, JAMES R. BIGNELL, a citizen of the United States, residing at Grand Rapids, in the county of Kent and State of Michigan, have invented new and useful Improvements in Cutting and Folding Machines, of which the following is a specification.

The present invention relates to cutting and folding machines; and its objects are, generally, to provide an improved machine for cutting and folding labels, patches and the like; and, more particularly, such a machine whereby a plurality of strips may be cut into suitable lengths, which are thereupon folded; and further, such a machine whereby labels and the like may be cut and may be folded on all four sides; and further, such a machine in which the strip feeding jaws are retracted from the label in the label's plane. Further objects, including such as relate to details and economics of construction, arrangement and operation, will appear from the following detailed description.

Figure 1 is a top plan view of a machine for cutting and folding labels, patches and the like;

Fig. 4 is an end view of said machine looking toward the right-hand side of the preceding views;

Fig. 5 is a rear view of the same;

Fig. 6 is an end view of said machine looking toward the left-hand side of Figs. 1 and 2;

Fig. 7 is a longitudinal sectional view of the same on a vertical plane corresponding to line 7—7 of Fig. 1;

Fig. 8 is a like view on a vertical plane corresponding to line 8—8 of Fig. 1;

Fig. 9 shows means for closing the folding jaws on the folded label, and is a section of parts of said machine taken on a vertical plane corresponding to line 9—9 of Fig. 1;

Fig. 10 is a section of one of the lower folding jaws, taken on a horizontal plane corresponding to line 10—10 of Fig. 9, and showing electric heating means;

Fig. 11 is a section of the same taken on a vertical plane corresponding to line 11—11 of Fig. 10;

Fig. 12 is a sectional view of parts shown in Fig. 9, taken on planes corresponding to line 12—12 of said figure.

Fig. 13 shows means for opening the feeding jaws, and is a section of parts of said machine taken on a vertical plane corresponding to line 13—13 of Fig. 1;

Fig. 14 shows means for closing the feeding jaws, and is a section of parts of said machine taken on a vertical plane corresponding to line 14—14 of Fig. 1;

Fig. 15 shows means for moving the pairs of folding jaws toward each other and means for opening the feeding jaws, and is a section of parts of said machine taken on a vertical plane corresponding to line 15—15 of Fig. 1;

Fig. 16 is a view in perspective of a reciprocating bar—part of said jaw—opening means;

Fig. 17 is a sectional view of parts shown in Fig. 15 taken on a horizontal plane corresponding to line 17—17 of said figure.

Fig. 18 is a section of the same taken on a vertical plane corresponding to line 18—18 of Fig. 17;

Fig. 19 is a side view of the cutting means, showing also means for closing the folding jaws, and is a section of parts of said machine taken on a vertical plane corresponding to line 19—19 of Fig. 1;

Fig. 20 is an opposite view of said cutting means with strip-holding means, and is a section of parts of said machine taken on a vertical plane corresponding to line 20—20 of Fig. 1;

Fig. 21 is a sectional view of the cutting means taken on planes corresponding to line 21—21 of Fig. 20;

Fig. 22 is a like view of the same taken on a plane corresponding to line 22—22 of Fig. 20;

Fig. 23 is a front view of parts shown in Fig. 20 looking toward the right-hand side of said figure and showing a fragment of the face plate 200 attached by screws 201.

Fig. 24 is a view in perspective of part of the strip-holding means shown in Fig. 20;

Fig. 25 is a top plan view of means for closing the folding jaws, and is a section of parts of said machine taken on a horizontal plane corresponding to line 25—25 of Fig. 5;

Fig. 26 is a section of the same taken on a vertical plane corresponding to line 26—26 of Fig. 25;

Fig. 27 is a section of the same taken on a vertical plane corresponding to line 27—27 of Fig. 25;

Fig. 28 is a section of the same taken on a vertical plane corresponding to line 28—28 of Fig. 25;

Fig. 29 is a transverse section of said machine taken on a vertical plane corresponding to line 29—29 of Fig. 1;

Fig. 30 is a like view of the same taken on a vertical plane corresponding to line 30—30 of Fig. 2;

Fig. 31 shows means for holding the secondary carriage in elevated position and for releasing the same therefrom, and illustrating said carriage in its elevated position; and is a section of parts of said machine taken on a vertical plane corresponding to line 31—31 of Fig. 1;

Fig. 32 is a like view of the same, but showing said carriage in lowered position;

Fig. 33 is a view in perspective of a block whereby said carriage is held in elevated position;

Fig. 34 is a front view of the horizontally reciprocating primary carriage, and the vertically reciprocating secondary carriage with operating means, and is a section of parts of said machine taken on a vertical plane corresponding to line 34—34 of Fig. 1;

Fig. 35 is a section of the same taken on a vertical plane corresponding to line 35—35 of Fig. 1;

Fig. 36 is a sectional view of the same taken on a horizontal plane corresponding to line 36—36 of Fig. 35;

Figure 41:
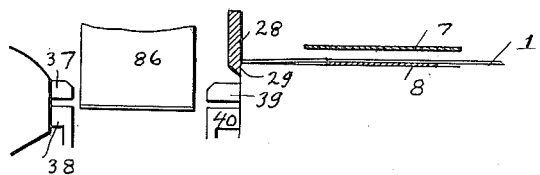
Figs. 41, 42, 43, 44, 45 and 46 show diagrammatically the progressive stages of the label feeding, cutting, and folding operations.
Figure 42:
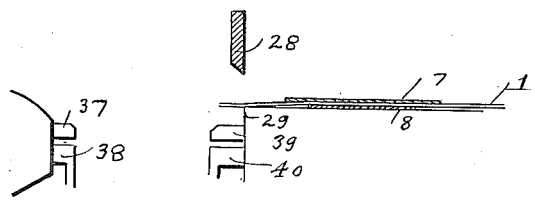
Figure 43:
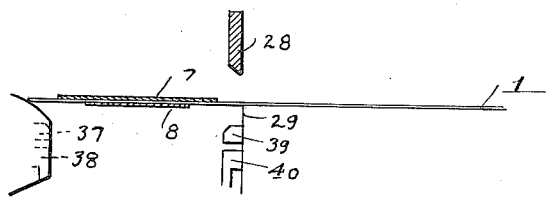
Figure 44:
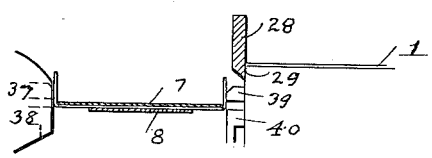
Figure 47:
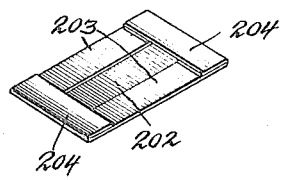
Figure 45:
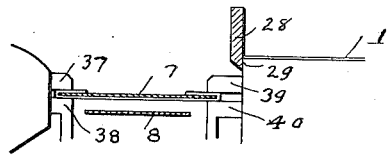
Figure 46:
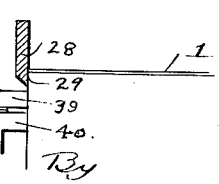

In Fig. 41, the label feeding jaws are open; in Fig. 42 they are closed on the label strip; in Fig. 43 they have fed the strip a label length beyond the cutting means; in Fig. 44 the cutting means has severed the label length and the feeding jaws have descended between the pairs of label folding jaws; in Fig. 45 the pairs of folding jaws have moved toward each other and each pair embraces a folded end of the label, and the lower feeding jaw has descended; and in Fig. 46 the feeding jaws have been retracted and each pair of folding jaws has pressed the folded label end over on the body of the label;

Fig. 47 is a view in perspective of a folded label 202 showing its folded over sides 203 and ends 204;

The embodiment of the invention chosen for detailed description in the body of this specification and for illustration by the drawings, and its operation, are as follows.

Figure 1:
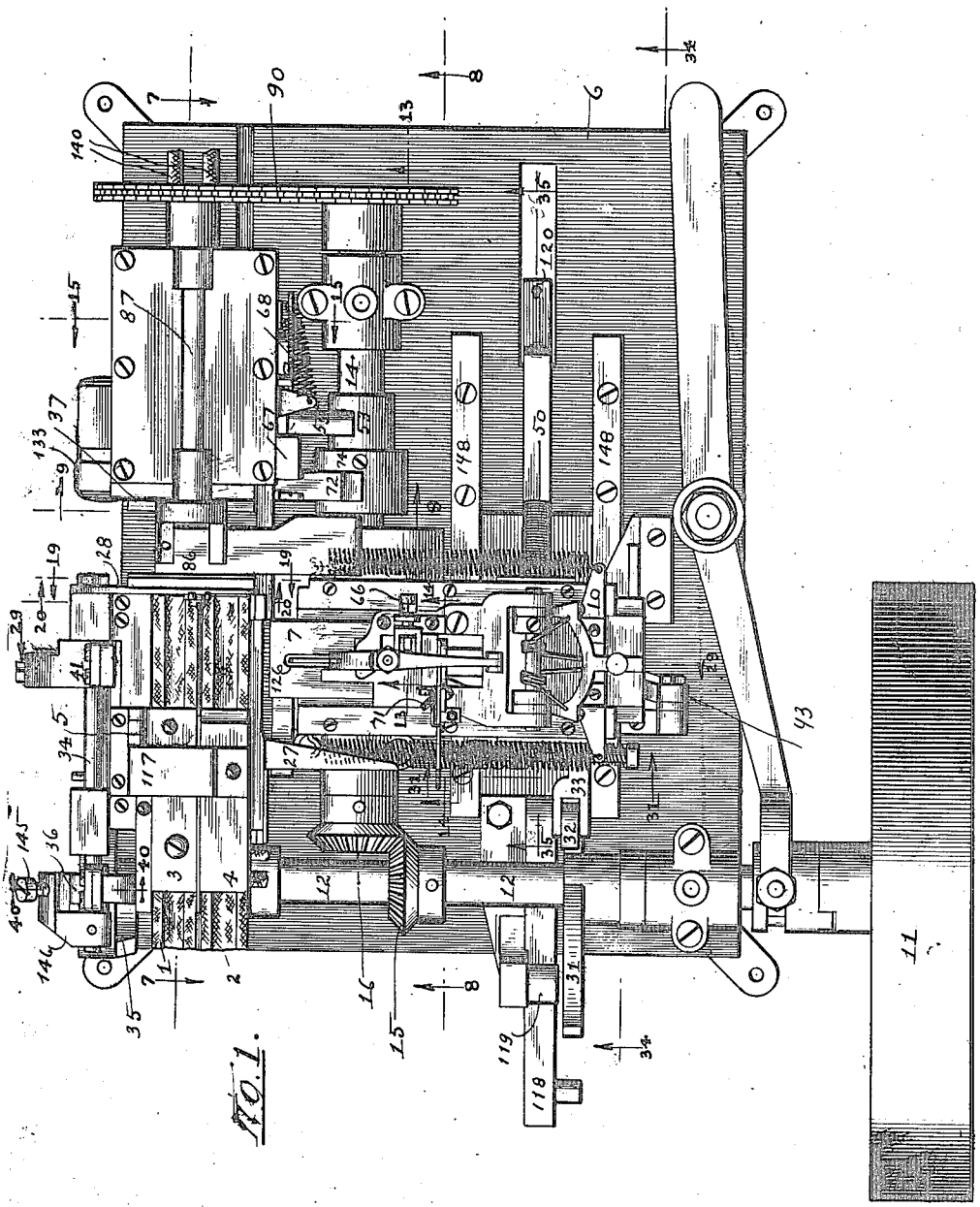
Figure 2:
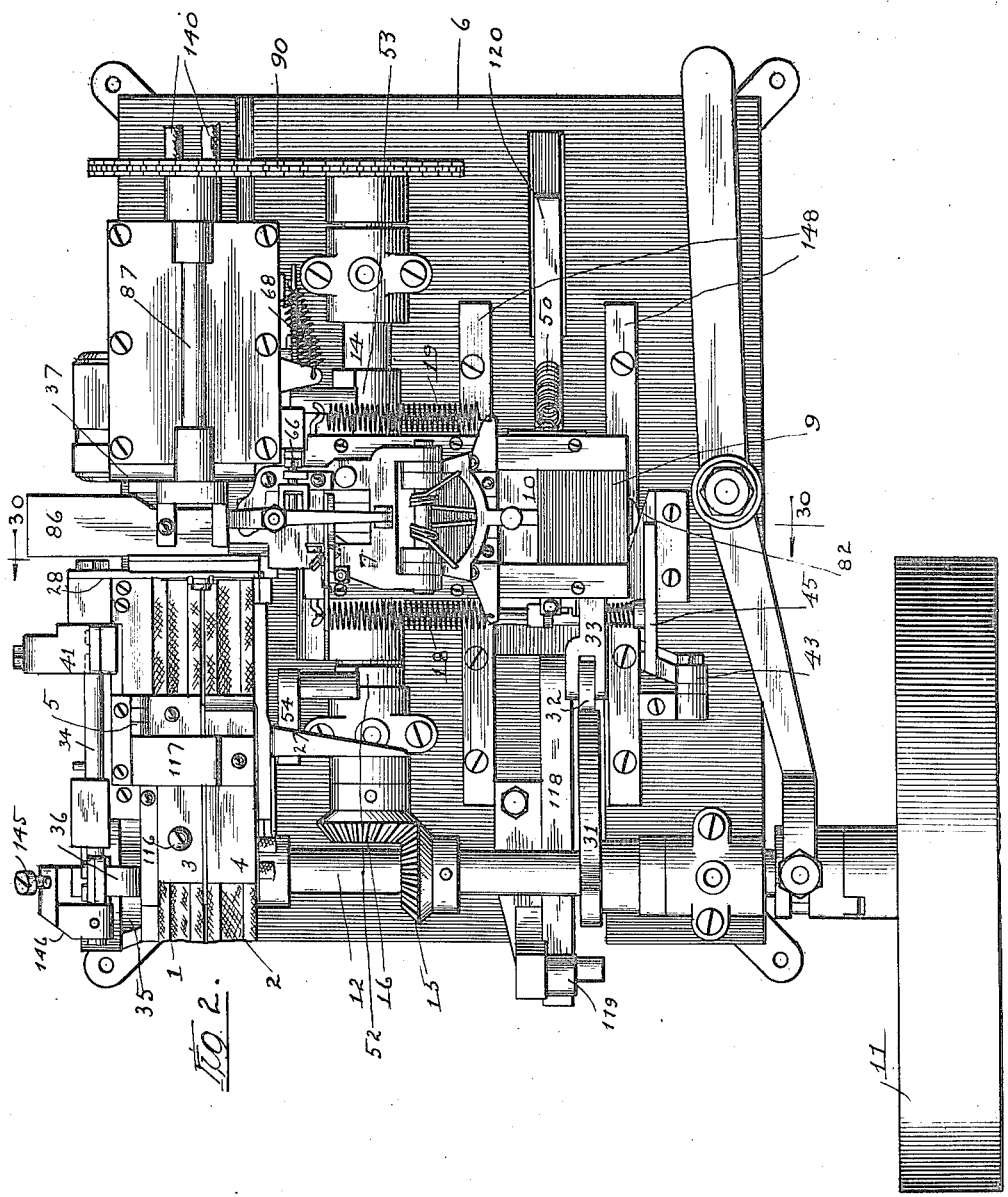
Fig. 2 is a like view of the same showing certain parts in another position.

First. A general description:

Fig. 1 shows the parts at the beginning of the cycle of the machine's operation. A pair of parallel strips 1, 2, from which the labels, patches or the like are to be cut, enter the machine shown in this figure from the left-hand side, and pass under weight guides 3, 4 respectively, which are pivoted at 5 to the main frame 6 of the machine so as to be severally and readily turned backwardly to insert and release the strips. The strip feeding jaws 7, 8 are open, and the secondary vertically movable carriage 9, supporting the tertiary horizontally movable carriage 10 on which said jaws are mounted, is in retracted position. Power applied to the pulley 11 on the driving shaft 12, journaled on the main frame, rotates the cam 13 on the shaft 14 by means of the bevel gears 15, 16. This cam, thus turned to its lower portion, permits the tertiary carriage 10 to move under the pressure of the springs 18, 19 toward the strips, such cam operating (in opposition to such springs) against the friction roller 20 on the lever 21 journaled on the primary horizontally movable carriage 17, the free end of which lever is connected by a link 22 to the tertiary carriage. (See Figs. 29, 30). When the feeding jaws have reached their limit in this movement, where they are in position to grasp the strips between them, they are closed on the strips by a spring 23 (Fig. 29): This spring is permitted to thus act, by the releasing of catch members 24, 25 which have held the jaws open, said members being so released by the lever arm 26, (to which one said member 24 is attached) whose inclined end 200 rides up a fixed bar 27 at the beginning of the feeding movement of the jaws (Fig. 14).

Figure 3:
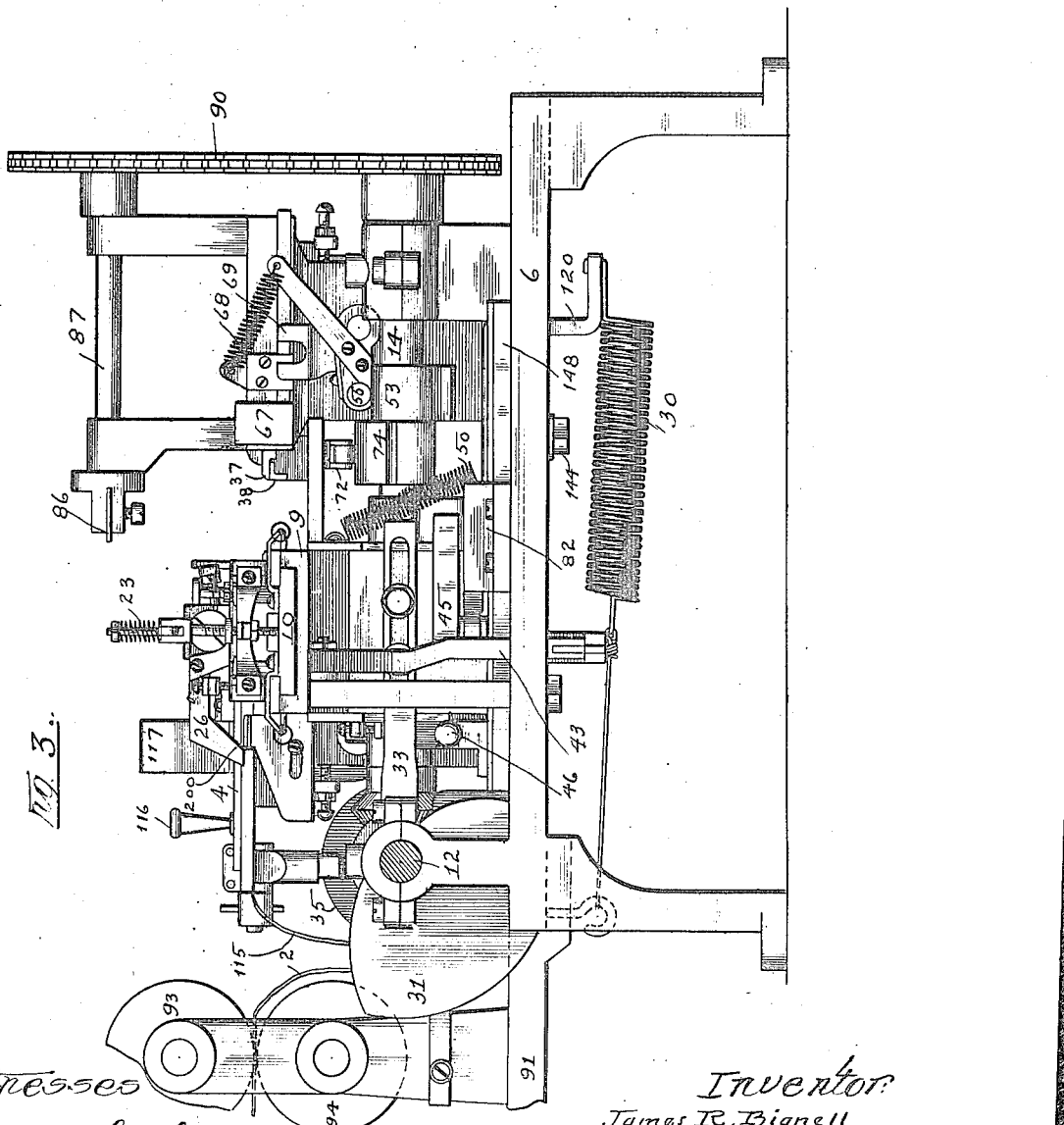
Fig. 3 is a front view of said machine.
Figure 37:
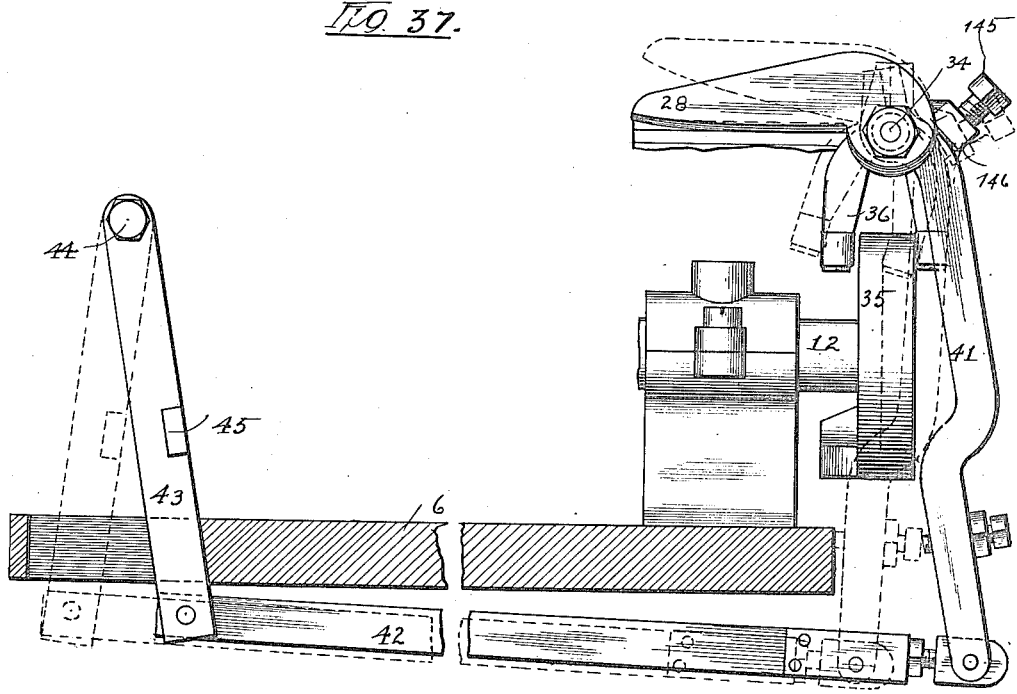
Fig. 37 shows the cutting means and means for permitting the secondary carriage to drop from its elevated position, together with cam operating means therefor.
Figure 38:
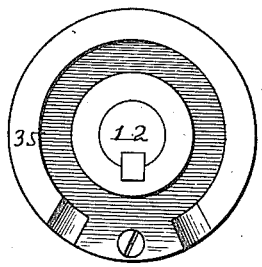
Fig. 38 is a face view of the cam of said operating means.

The strips being now grasped by the feeding jaws, are fed thereby toward the right-hand side of Fig. 1 to, and one label-length beyond, the cutting means (comprising the movable shear blade 28 and fixed shear blade 29) and against the pressure of the spring 30, by the cam 31 on the driving shaft, such cam engaging a friction roller 32 on the bar 33 attached to the primary carriage (Figs. 3 and 34). The movable shear blade is now moved downwardly to sever the label-length from each strip, by the rocking of its shaft 34 pivoted on the main frame, such rocking being effected by the double face cam 35 on the driving shaft and positively operating on the straddling cam rider 36 clamped to said blade's rock shaft (Figs. 37, 38, 39, 40). The cam 31 on the driving shaft is now on its high dwell. When the cutting means operate, the secondary carriage is permitted to drop and thus carries the feeding jaws, with the label-lengths held thereby, between the opposite pairs of folding jaws 37, 38, 39, 40, whereby the ends of the label-lengths are by the upper folding jaws 37, 39 turned upwardly. This dropping of the secondary carriage is effected by the movement of the lever arm 41 (Fig. 37) on said shear blade's rock shaft, which arm is connected by the rod 42 to the lever arm 43 fulcrumed at 44 on the main frame.

The horizontal extension 45 of this arm engages the push rod 46 and moves it against its spring 47 to carry its member 48 from supporting engagement with the block 49 mounted on said secondary carriage, whereupon said carriage drops to its lowered position by gravity and under the action of the spring 50 (Figs. 31, 32, 33, etc.) The two opposite pairs of folding jaws are now moved toward each other by the spring 51, which is permitted to thus act by the turning of the cams 52, 53 (on shaft 14) to their lower portions whereby the lever arms 54, 55 riding thereon fall (Fig. 8), causing the arms 56, 57 carried by their rock shafts 58. 59 to turn from their holding engagement with the pins 60, 61 on the respective lower folder jaws: Thus, the pairs of open folder jaws—the upper and lower jaws of each pair being pivotally connected at 60 and 61 respectively and opened as by springs 62, 63 (Fig. 7)—are moved toward each other, and each pair folds an end of said label-lengths over the edge of the upper feeding jaw (Fig. 45).

The feeding jaws are opened to release the label-lengths and against the pressure of the spring 23, by a toggle, the pivotal connection of whose arms 64 and 65 is moved to straighten such arms by a push rod 66 moved by a bar 67 slid (against the pressure of a spring 68) by the said falling of one of the lever arms 55 whose extension 69 operatively engages the lug 70 on said bar. (Figs. 8, 13.) When the feeding jaws are thus opened, they are held open by the catch members 24, 25 whose operative mutual engagement is actuated by the spring 71.

The upper and lower of each pair of folder jaws are now partially closed to lightly press the folded ends of the label-lengths between them. This is effected by the riding of the lever arm 72 up on the intermediate dwell 73 of the cam 74 on shaft 14, whereby, through said lever arm's roller 75 engaging beneath the lower folder jaw 38, such jaw is raised (Fig. 9): this lever arm in rising carries with it the overlying extension 76 of a similar lever arm 77 provided with a like roller 78 and operating to raise the other lower folder jaw 40 in like manner. (Figs. 19, 25, 28).

The feeding jaws are now retracted, leaving the folded label-lengths between the folder jaws, and by means to be presently explained. On the retraction of the feeding jaws, the lever arm 72 rides up on the highest dwell 79 of the cam 74, (Fig. 9), whereby the folder jaws of each pair are tightly pressed on the folded label-lengths between them, the ends thereof being pressed directly on their body portions (Fig. 46).

The upper feeding jaw is retracted from the label-lengths in the same plane or at the same level in which such label-lengths lie, by the horizontal movement of the tertiary carriage.

The cut-off label-lengths, tightly clasped by the partly closed folder jaws at the time of such retraction, are thus not so liable to be drawn out from the folder jaws by said withdrawing feeding jaw, as they would be if said jaw's retracting movement were not in the label-lengths' plane, but in another direction, as in an arc.

When the label-lengths are wide, or where a plurality of them disposed edge to edge are cut and folded simultaneously as shown, the advantage resulting from said direction of the feeding jaws withdrawing movement is especially important. The tertiary carriage is slid away from the label-lengths to thus withdraw the feeding jaw, by the turning of the higher portion of the cam 13 in engagement with the roller 20 of the lever 21 (Fig. 29). The tertiary carriage being now slid back, retracting the feeding jaws, the high dwell of cam 31 turns from engagement with the roller 32 and the primary carriage is returned by the spring 30 to its initial position shown in Fig. 1, to begin the cycle of the machine's operation again. During said travel to such initial position, the secondary carriage is raised to its elevated position by the roller 80 on the bar 81, slidable on the primary carriage, engaging and riding on the vertical face of the incline 82 fixed on the main frame, thus sliding said bar inwardly against the pressure of a spring 83: this bar has a cam surface 84 on which by said sliding movement the roller 85 on the secondary carriage is made to ride upwardly. (Figs. 29, 30, 35, 36.) When the secondary carriage is thus raised to its elevated position, it is held therein by the supporting engagement of the member 48 (carried by the push rod 46) with the block 49 of the secondary carriage, said push rod being moved by its spring 47 into the position shown in Fig. 31.

Upon the opening of the folding jaws after pressing down the ends of the label-lengths, such label-lengths are ejected by a finger 86 carried on the shaft 87, which is revolved by the shaft 14 through sprocket wheels 88, 89 carrying the chain 90.

Second. A more detailed description of certain parts, etc.:

The weight guide 3 has a handle 116; the weight guide 4 is pivotally mounted at 5 by means of a member 117 which extends over and above weight guide 3. A guide bar 118 attached to the primary carriage bears on its upper surface against a guide roller 119. A bar 120 on said carriage serves as an attachment for the spring 30. The feeding jaws are pivotally mounted at 121 on the tertiary carriage. The lower feeding jaw 8 is yieldingly held up in proper position for grasping the strips and feeding them to the cutting means, by a spring 123 whose upward pressure of said jaw is adjustably limited by a screw 122 threaded in an extension 162 of said jaw on the opposite side of the pivot 121 and abutting on the tertiary carriage (Figs. 29, 30): and the downward movement of the upper jaw 7 relatively to said carriage, under the pressure of the spring 23 surrounding the pin 163 fixed on the lower jaw, is adjustably limited by the screw 157 threaded in the upper jaw and abutting against said carriage (Figs. 4, 6). Said upper jaw has a gripper 124 pivoted on an arm 125 pivoted to said jaw, which gripper extends through a slot 126 in said jaw and extends over both label-strips, to equalize thereon the pressure exerted by the spring 23. (Figs. 1, 29, 30). The movable shear blade carries a spring member 127 clamped thereto by a member 128 secured to said blade by a screw 129. This spring member engages the strips just before said shear blade reaches them and holds them during the cutting operation and until the strips are reëngaged by the feeding jaws (Figs. 20, 21, 24).

Figure 40:
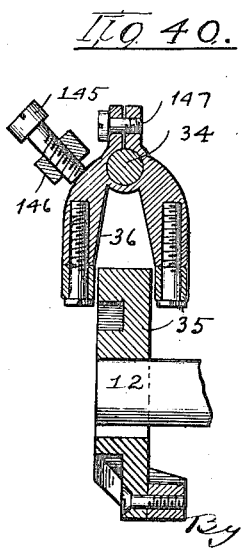
Fig. 40 is a sectional view of said cam and its cam rider, and is taken on a vertical plane corresponding with line 40—40 of Fig. 1.
Figure 39:
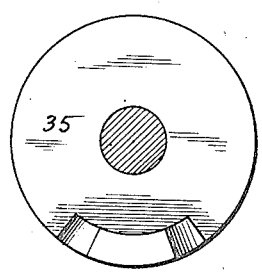
Fig. 39 shows the opposite side of said cam.

The lever arm 72 has a longitudinal extension 130 to which it is pivotally connected at 131 and is vertically adjustable thereon by a screw 132: said extension is pivotally mounted on the main frame at 133 (Fig. 27). The corresponding lever arm 77 pivotally mounted on the main frame at 134 has a member 135 carrying the roller 78 and adjustable vertically by the oppositely directed screws 136, 137 threaded in said member (Fig. 28). The lower folder jaws contain electric heating coils 138, 139 (having electric connections 140) whereby said jaws are heated to iron down the folded ends of the labels (Figs. 7, 10, 11). The guides wherein the primary carriage reciprocates are shown at 148: the guide bearing for the vertical movement of the secondary carriage is shown at 141 (Figs. 29, 30): and the guides wherein the tertiary carriage reciprocates are shown at 142. The member 143 on which one pair of folder jaws 37, 38 move toward and away from the other pair of folder jaws 39, 40, is adjustable on the main frame toward and away from said jaws 39, 40, and clamped in desired adjustment by a bolt 144 (Figs. 5, 7, 9, 12). The cam rider 36 accurately adjustable relatively to the shaft 34 by the screw 145 threaded in the member 146 which is pinned to said shaft, is clamped in said adjustment by a screw 147 (Figs. 5, 6, 40).

The invention being intended to be defined solely by the claims, is not to be limited to or by details of construction shown or described.

I claim,

1. In a machine of the character described; cutting means for severing a label-length from a strip; folding means for folding the ends of a severed label-length thereof; feeding jaws adapted to horizontally feed the strip to the cutting means and to vertically carry a severed label-length thereof to the folding means; a primary carriage horizontally movable parallelly to the strip; a secondary carriage movable vertically on the primary carriage downwardly to carry the label-length to the folding means; and a tertiary carriage horizontally movable on the secondary carriage toward and away from the strip and carrying by its toward movement the jaws which are mounted thereon to their position for feeding the strip, and by its away movement from the severed label-length thereof.

2. In a machine of the character described; cutting means for severing a label-length from a strip; folding means for folding the ends of a severed label-length thereof; feeding jaws adapted to horizontally feed the strip to the cutting means and to vertically carry a severed label-length thereof to the folding means; a primary carriage horizontally movable parallelly to the strip; a secondary carriage movable vertically on the primary carriage downwardly to carry the label-length to the folding means; and a tertiary carriage horizontally movable on the secondary carriage toward and away from the strip and carrying by its toward movement the jaws which are mounted thereon to their position for feeding the strip, and by its away movement from the severed label-length thereof; and means for so moving the carriages and for raising the secondary carriage from lowered position.

3. In a machine of the character described; cutting means for severing a label-length from a strip; folding means for folding the ends of a severed label-length thereof; feeding jaws adapted to horizontally feed the strip to the cutting means and to vertically carry a severed label-length thereof to the folding means; a primary carriage horizontally movable parallelly to the strip; a secondary carriage movable vertically on the primary carriage downwardly to carry the label-length to the folding means; and a tertiary carriage horizontally movable on the secondary carriage toward and away from the strip and carrying by its toward movement the jaws which are mounted thereon to their position for feeding the strip, and by its away movement from the severed label-length thereof; cams for moving the primary carriage and the tertiary carriage; and means for raising and for lowering the secondary carriage.

4. In a machine of the character described; a frame; strip feeding means; a primary carriage movable on the frame; a secondary carriage movable on the primary carriage and supporting the feeding means; an incline on the frame; a bar having a cam and slidable on the primary carriage by engaging with the incline during said carriage's movement; the bar's cam being adapted to engage by the bar's sliding movement the secondary carriage to move the same.

5. In a machine of the character described; strip feeding means; a primary carriage movable on the frame; a secondary carriage movable vertically on the primary carriage and supporting the feeding means; a push rod having a member adapted to engage the secondary carriage to hold the same in elevated position; a driven part; and connections between said part and the push rod and adapted to move said rod to release its said member from the secondary carriage.

6. In a machine of the character described; a frame; strip feeding means; a primary carriage movable on the frame; a secondary carriage movable on the primary carriage and supporting the feeding means; a push rod slidable on the frame and having a member adapted to engage the secondary carriage to hold the same in elevated position; a lever pivoted on the frame and adapted to be swung to push said rod to release its said member from the secondary carriage; a driven part; and connections between said part and the lever to swing the lever.

7. In a machine of the character described; a pair of coöperating relatively movable folding jaws; a cam having three dwells and adapted to thereby move the jaws into three interrelative positions, the first dwell to open the jaws, the second dwell to partly close them, and the third dwell to further close the jaws.

8. In a machine of the character described; pairs of relatively movable folding jaws; feeding jaws adapted to grasp a label-length between them and to carry the same between said pairs; means for moving each pair of open folding jaws toward and beyond the adjacent edge of one feeding jaw to fold the end of the label-length over said edge; means for partly closing each pair of folding jaws to press such folded ends on said feeding jaw; means for retracting said jaw from the label-length; and means for further closing each pair of folding jaws to press the folded ends of the label-length directly on the body thereof.

9. In a machine of the character described; relatively movable feeding jaws adapted to grasp a label-length between them and having a retracting movement therefrom in a plane parallel with the plane in which the label-length's face lies.

10. In a machine of the character described; cutting means for severing a label-length from a strip; and feeding jaws adapted to grasp the strip between them to feed the strip to said means, and having a movement toward the strip and a retracting movement from the severed label-length, said toward movement being in a plane parallel with the plane in which the strip's face lies, and said retracting movement being in a plane parallel with the plane in which the severed label-length's face lies.

11. In a machine of the character described; relatively movable folding jaws adapted to press the end of a label-length on the body of the label; a moving part; a lever arm adapted to move one of said jaws toward the other to effect said pressing and operated by said moving part; and means for adjusting the swing of said arm relatively to said jaw.

In testimony whereof I have hereunto set my hand in presence of two subscribing witnesses, at Grand Rapids, Michigan, this ninth day of September, A. D. 1916.

JAMES R. BIGNELL.

Witnesses:
CYRUS W. RICE,
GANSON TAGGART.